United States Patent [19]

Nott

[11] 3,974,067

[45] Aug. 10, 1976

[54] METHOD FOR IMPROVING CLAY BRIGHTNESS UTILIZING MAGNETIC SEPARATION

[75] Inventor: Alan J. Nott, Tennille, Ga.

[73] Assignee: Anglo-American Clays Corporation, Sandersville, Ga.

[22] Filed: Oct. 8, 1974

[21] Appl. No.: 513,154

[52] U.S. Cl. .................................. 209/3; 209/39; 209/10; 209/166
[51] Int. Cl.² .......................................... B03B 1/00
[58] Field of Search ................ 209/166, 214, 5, 39, 209/3, 9, 18, 140, 10; 210/42

[56] References Cited
UNITED STATES PATENTS

| 2,249,569 | 7/1941 | Phelps | 209/166 |
| 3,032,189 | 5/1962 | Adam | 209/214 X |
| 3,273,707 | 9/1966 | Maltby | 209/39 |
| 3,302,785 | 2/1967 | Greene | 209/166 X |
| 3,450,257 | 7/1969 | Cundy | 209/166 X |
| 3,462,013 | 8/1969 | Mercade | 209/166 X |
| 3,471,011 | 10/1969 | Ianicelli | 209/214 |
| 3,676,337 | 7/1972 | Kolm | 210/42 |
| 3,826,365 | 7/1974 | Mercade | 209/5 |
| 3,853,983 | 12/1974 | Abercrombie | 209/214 X |

*Primary Examiner*—Robert Halper
*Attorney, Agent, or Firm*—Stefan J. Klauber

[57] ABSTRACT

A method for brightening a kaolin clay wherein an aqueous dispersion is initially formed of said clay, which dispersion is blunged and conditioned and the resultant slurry thereupon subjected to a froth flotation treatment to remove titaniferous impurities. The purified product from the froth flotation treatment is thereupon subjected to magnetic separation by passing such product through a slurry-pervious ferromagnetic matrix positioned in a high intensity magnetic field, which results in substantial, additional brightening of the clay.

12 Claims, No Drawings

METHOD FOR IMPROVING CLAY BRIGHTNESS UTILIZING MAGNETIC SEPARATION

BACKGROUND OF INVENTION

This invention relates generally to methods for beneficiation of kaolin and other clays, and more specifically relates to a method for improving the brightness of kaolin clays or the like through the conjunctive use of a high intensity magnetic field.

Natural clays, including kaolin clays, frequently include discoloring contaminants in the form of iron and/or titanium-based impurities. The quantities of titanium-based impurities are particularly significant in the case of the sedimentary kaolins of Georgia, where such impurities are commonly present as iron-stained anatase and rutile. In order, therefore, to refine the clay and bring the brightness characteristics of the resultant product to a level acceptable for paper coating applications, various techniques have been used in the past to remove such discoloring impurities. Thus, for example, hydrosulfites have been widely used for converting at least part of the iron-based (or "ferruginous") impurities to soluble forms, which may then be removed from the clay.

Among the most effective methods for removing titaniferous impurities, including e.g. iron-stained anatase, are the well-known froth flotation techniques. According to such methods an aqueous suspension or slurry of the clay is formed, the pH of the slurry is raised to an alkaline value, for example, by the addition of ammonium hydroxide, and a collecting agent is added, for example, oleic acid. The slurry is then conditioned, by agitating same for a relatively sustained period. A frothing agent, for example, pine oil, is added to the conditioned slurry, after which air is passed through the slurry in a froth flotation cell, to effect separation of the impurities.

Within recent years it has been contemplated that magnetic separation techniques might be utilized in order to remove certain of the aforementioned impurities, including titaniferous impurities as well as certain ferruginous matter. Anatase, for example, and certain other paramagnetic minerals have been found to respond to high intensity magnetic fields. Thus in U.S. Pat. No. 3,676,337 to Henry H. Kolm, for example, a process is disclosed for treating slurries or the like by passing same through a steel wool matrix in the presence of a background field of at least 12,000 gauss. Such process has been found useful in removing the aforementioned contaminants from kaolin slurries. The apparatus disclosed in Marston, U.S. Pat. No. 3,627,678, is similarly utilizable in separating the aforementioned impurities from a clay slurry. In this latter instance, the slurry to be treated is thus passed through a canister including a stainless steel or similar filamentary matrix, while a high intensity magnetic field is impressed on the said matrix.

A study of the prior art including the patents cited, will demonstrate that prior researchers have considered flotation technology on the one hand and magnetic separation treatment on the other, to be alternate approaches to the impurity-removal problem. The explanation of this appears to be that froth flotation has been considered so effective in removing titaniferous impurities, that it has been believed that no significant advantage could derive from subsequent use of magnetic separation — except for removal of ferruginous matter, which in any event is removable by normal leaching.

SUMMARY OF INVENTION

Now in accordance with the present invention, it has been unexpectedly found, that clay slurries after being subjected to a thorough froth flotation treatment, may yet be substantially improved in leached brightness characteristics, by subjecting the purified slurry to further treatment in a high intensity magnetic field. It has been found as one aspect of the present discovery, that where the slurry product of flotation is analyzed prior and subsequent to magnetic treatment, the changes in $TiO_2$ and $Fe_2O_3$ content is so small as to not fully explain the observed brightness improvement. It is therefore hypothesized that the froth flotation process, in some manner not fully understood, in addition to removing titaniferous impurities, renders other contaminants in a form enabling these contaminants to thereupon respond to the high intensity magnetic field. Such a result may, for example, be brought about by the relatively high amounts of energy dissipated during the conditioning process incident to froth flotation; or may be brought about by the combination of energy dissipation with the chemical agents utilized in flotation, such as the collector agents, etc.; or by other aspects of the froth flotation process. In any event, and in consequence of such treatment, it appears that certain heretofore unresponsive impurities, possibly including mica for example, may then be effectively removed by the magnetic techniques previously mentioned.

The magnetic separation step of the present invention is preferably brought about by passing the aqueous clay slurry through a slurry-pervious ferromagnetic matrix, while a high intensity magnetic field is applied at the matrix. The said field may be generated by electromagnets or other field sources, which at least partially surround a non-magnetic canister in which the matrix is packed. The matrix material, as is known in the art, preferably comprises a packed stainless steel wool; although other filamentary or strand-like materials may be effectively used for this purpose; as may matrices of steel balls, tacks, and of other slurry-pervious ferromagnetic materials.

The average field intensity maintained at the matrix during the separation process is in the general range of 7 to 22 kilogauss; and a preferable field intensity during the separation process is about 15 to 20 kilogauss. The slurry is passed through the matrix at such a rate as to be maintained in the field for at least 15 seconds, with from ½ to 2 minutes retention time being preferred. Subject to the effect on processing rates, longer retention times are also acceptable; and can occur from either a single pass or via cumulative passes through the matrix. The slurry as passed to the magnetic separator typically includes from about 15 to 45% solids, with 15 to 35% solids being preferable.

DESCRIPTION OF PREFERRED EMBODIMENT

In accordance with the present invention, the kaolin or other clay to be brightened, is initially processed through a series of steps which includes subjecting such clay to a froth flotation treatment. In a preferable procedure, for example, the crude clay is blunged and conditioned by forming an aqueous, alkaline, dispersion of the clay (pH adjusted to about 7 to 10 with ammonium hydroxide), which dispersion may include as a deflocculating agent a water soluble salt of a polyacrylic acid or a polymethacrylic acid, preferably having an average molecular weight in the range of 500 to 10,000; together with sodium silicate; and oleic acid or other collector agent. Where employed, the polyacrylate and/or polymethacrylic salts are typically present from about ½ to 3 lbs/ton; suitable materials of this type are, for example, available from Allied Colloids, Great Britain, under the trade name "Dispex" (e.g. Dispex N-40). Sodium silicate is present in a range from about ½ to 16 lbs/ton; and oleic acid up to about 12 lbs/ton; preferably in the range of about 2 to 4 lbs/ton. The blunging and conditioning steps are preferably conducted simultaneously, whereby the oleic acid or similar collector agent may partially function as a dispersant, thereby enabling minimization of the quantity of sodium silicate used — which has been found to be advantageous in that sodium silicate when present in excess acts as a depressant during froth flotation.

The slurry during the aforementioned blunging and conditioning operations may include from about 20 to 70% solids, but preferably includes a relatively high solids content, i.e. from about 35 to 60% solids. The conditioning process is preferably continued for a sufficient time to dissipate at least 25 hp-hrs. of energy per ton of solids, although more generally the invention is effective where as little as 10 hp-hrs. per ton of solids of energy is dissipated. The blunged and conditioned slurry, after addition of a frothing agent as, for example, pine oil, is then subjected to a conventional treatment in a froth flotation cell, i.e. air is passed through the slurry in said cell to effect separation of impurities from the clay.

With the exception of the preferred use in the present invention of simultaneous blunging and conditioning as heretofore mentioned, the methods thus far described comprise, per se, conventional froth flotation techniques for purifying kaolin clays, particularly of titaniferous impurities; and in this connection further details of froth flotation treatment are set forth at numerous patents of the prior art, as for example, in U.S. Pat. Nos. 2,990,958; 3,138,550 and 3,450,257.

As has heretofore been mentioned, it has previously been assumed that the froth flotation technology was as effective or more effective than magnetic separation in removing titaniferous impurities. It seemed further that no advantage could flow from subsequent use of a magnetic separation step, in that the ferruginous impurities which presumably might thereupon be removed, could in any event be removed by conventional leaching. In accordance with the present invention, however, it has unexpectedly been discovered that the froth flotation process as herein practiced can, on the contrary, serve as a prelude to a magnetic separation treatment which thereupon effects highly significant and unexpected improvements in the already substantially refined clay. In order to demonstrate the efficacy of this conjunctive treatment, a series of Examples are now set forth, wherein crude Georgia kaolins are subjected to froth flotation treatment in accordance with the prior discussion, and are then processed by conventional leach and dewatering treatments to establish leached brightness levels for the ensuing samples. Comparative results are then set forth wherein the samples emerging from the froth flotation process are subjected to magnetic separation; and then to comparable leaching and dewatering treatments to yield comparison brightness values.

EXAMPLE I

In this Example a representative sedimentary soft Georgia kaolin was subjected to the aforementioned sequence of treatments culminating in treatment in a froth flotation cell. The said treatments were all conducted in an industrial plant environment, and the total amount of energy dissipated during blunging and conditioning was at least 25 hp-hr/ton of solids. The purified product, as derived from the flotation cell, was found (unleached) to display a G.E. brightness of 87.5. In all instances in this specification it will be understood that brightness values are obtained according to the standard specification established by TAPPI procedure T-646m-54. Comparable leached brightness values were obtained by centrifuging the said plant flotation product to yield a substantially minus 3-micron fraction, and subjecting same to a conventional leaching treatment with sodium hydrosulfite at an addition level of 8 lbs/ton. The resultant leached brightness was 90.7. The $TiO_2$ content before leaching, was measured at 0.38%, and the $Fe_2O_3$ content, at 0.42%.

For further purposes of comparison, crude clay samples were diverted from the feed to the blunger, i.e. at the aforementioned plant, and subjected to the same schedule of blunging, conditioning and froth flotation — this time, however, in a laboratory environment wherein the parameters of treatment are more precisely regulatable. During such treatment ammonium hydroxide (calculated at 100% ammonia) was typically added at about 3.9 lb/ton of dry clay; oleic acid in concentration of about 3.7 lb/ton; and sodium silicate in concentration of about 2.7 lb/ton. The total dissipated mechanical work during the process, far exceeded 25 hp-hr/ton of solids. The unleached brightness of a sample from the flotation treatment was found to be 88.5 in this instance; and the leached brightness of the laboratory-floated clay (again utilizing 8 lbs/ton of hydrosulfite) was found to be 90.8. The $TiO_2$ content in this instance was 0.22% and $Fe_2O_3$ content 0.48%. Since a mathematical analysis of the chemical analysis techniques utilized, indicates a probable error in $TiO_2$ analysis of ± 0.07%, the comparison between laboratory and plant flotation indicates that the plant flotation methodology is indeed performing its function and very effectively removing the titaniferous impurities.

Samples emerging from the plant flotation cell (brightness level of 87.5) were then subjected to treatment in a high intensity magnetic field. The slurry samples thus treated included 30% solids content (after being diluted, as appropriate), were passed through the magnetic separator at a pH of about 9.3, and at a temperature of approximately 30°C. The apparatus utilized was of the general type illustrated in the aforementioned Marston U.S. Pat. No. 3,627,678 patent, and thus generally comprised a canister packed with a stainless steel wool at which enveloping magnets provided an approximate field intensity of about 15.5 kilogauss during the separation process. The stainless steel wool had a 7.5% packing, by which it is meant that 7.5% of the canister volume was effectively occupied by the matrix material. During the magnetic treatment the flow rate of the slurry was such that retention time in the magnetic field was approximately 1.2 minutes. The samples emerging from the magnetic separator were thereupon flocculated at a pH of 3, after which a conventional leaching step was effected by addition of sodium hydrosulfite, followed by conventional dewatering etc. to yield a test sample. The results of the foregoing operations are set forth in Table I hereinbelow:

Table I

| Feed Time Mins. | Product Brightness | Leached Brightness | | | | $TiO_2$ % | $Fe_2O_3$ % |
|---|---|---|---|---|---|---|---|
| | | 2 | 4 | 6 | 8 | | |
| | | pounds per ton | | | | | |
| 4.5 | 89.8 | 91.5 | 91.5 | 91.7 | 91.4 | 0.34 | 0.38 |
| 9.0 | 89.4 | 90.2 | 91.3 | 91.1 | 91.1 | 0.42 | 0.48 |
| 18.0 | 89.0 | 90.2 | 90.8 | 91.2 | 91.4 | 0.38 | 0.36 |
| 27.9 | 89.2 | 91.1 | 91.3 | 91.3 | 91.3 | 0.34 | 0.37 |
| 5 passes of 27 mins. | 88.7 | 91.3 | 91.4 | 91.4 | 91.5 | 0.26 | 0.38 |

The brightnesses specified in Table I are all obtained in accordance with the procedures heretofore described. The first four tabularized feed time values indicate that after operating the separator for the time specified, a sample of the total volume emerging from the magnetic separator (after one pass) was subjected to brightness testing. For example, in the first instance, after a period of 4.5 minutes of running time, a sample of the total product from the separator was taken as it emerged from the separator and found to have an unleached product brightness of 89.8. These same samples were similarly found to have leached brightnesses, with various addition levels of sodium hydrosulfite, as is indicated under the addition levels of 2, 4, 6 and 8 pounds per ton of the leach agent. After 4½ minute operation the magnetic separator matrix was flushed, and a second run initiated, which then was continued for 9 minutes, after which samples were again taken to yield the data proceeding to the right of the Table. The general decline in brightness levels with increasing running time is, of course, due to growing contamination of the sepator matrix.

Finally, there is tabulated as the last entry in Table I, an instance where the slurry was passed successively five times through the matrix, the operating time for effecting each pass of the entire sample being 27 minutes.

It will be noted from Table I that very substantial improvements in the brightnesses of the samples were obtained both with and without additional leaching. An equally significant finding is apparent from the $TiO_2$ and the $Fe_2O_3$ contents, which are tabularized at the right-hand side of the Table. (The $TiO_2$ and $Fe_2O_3$ contents set forth in Tables I through X of this specification, are all derived from analyses of the unleached samples.) When these values are compared with the $TiO_2$ and $Fe_2O_3$ values previously given for samples which had been floated but not subjected to magnetic separation (see above); and further when account is taken of the cited measuring error of about ± 0.07% in $TiO_2$ determination; it becomes evident that the bulk of staining $TiO_2$ has in fact been removed by the prior flotation process; and that very little further effect has been had upon either the $TiO_2$ or $Fe_2O_3$ content as a result of the magnetic separation. These facts, when taken in comparison to the very marked improvement in brightness level, strongly suggest that the staining impurities removed during magnetic separation, are other than the two factors tabularized. Possibly, for example, as previously suggested, the element being acted upon is mica, although it is possible that additional staining elements as yet unknown, having been rendered tractable by the prior conditioning and froth flotation process, are removed by the magnetic separation.

EXAMPLE II

In this Example the clay sample taken from the plant after froth flotation exhibited a brightness of 87.1; and a minus 3-micron fraction obtained therefrom by centrifuging was found after leaching (utilizing a leach additional level of 8 lbs. sodium hydrosulfite per ton) to exhibit a brightness of 89.6. The $TiO_2$ content of the unleached sample was 1.01, and the $Fe_2O_3$ content 0.72. A comparable sample taken from the feed to the blunging and conditioning apparatus, and froth flotation processed under laboratory conditions, exhibited a product brightness of 87.1. The laboratory-floated sample further, exhibited leached brightnesses of 89.5 at 2 lbs./ton hydros (sodium hydrosulfite) addition; 90.1 at 4 lbs/ton hydros addition; 90.3 at 6 lbs./ton hydros addition, and 90.6 at 8 lbs./ton hydros addition. The $TiO_2$ content of the laboratory-floated sample was 0.40%, and the $Fe_2O_3$ content was 0.70%.

Utilizing the same magnet condition as described in connection with Example I, and with an input slurry solids content of 30%, and pH of 9.5, the brightness improvements indicated in Table II below were obtained, where in each instance the parameters identified are in accordance with the discussion had in connection with Example I. It will again be noted here that a very substantial increase in product brightness has been obtained — particularly in comparison to the plant product brightnesses, but also in comparison to the laboratory processed samples. Such improvement is particularly evident at reduced levels of leach addition. Again it will be noted that the differences in $TiO_2$ and $Fe_2O_3$ content in comparison to the contents of these contaminants where froth flotation alone is practiced, is relatively small — where the limits of experimental error are taken into account.

Table II

| Feed Time Mins. | Product Brightness | Leached Brightness | | | | $TiO_2$ % | $Fe_2O_3$ % |
|---|---|---|---|---|---|---|---|
| | | 2 | 4 | 6 | 8 | | |
| | | pounds per ton of hydros | | | | | |
| 4.5 | 89.7 | 91.1 | 91.2 | 91.2 | 91.2 | 0.50 | 1.0 |
| 9.0 | 89.9 | 90.5 | 91.5 | 91.5 | 91.5 | 0.48 | 1.1 |
| 18.0 | 89.7 | 90.3 | 90.8 | 91.1 | 91.2 | 0.45 | 0.99 |
| 27.0 | 89.7 | 90.6 | 91.1 | 91.1 | 91.1 | 0.49 | 0.98 |

EXAMPLE III

In this instance a further formulation of a soft sedimentary Georgia kaolin clay crude was utilized. A sample here, taken directly from the output of the flotation plant, exhibited a product brightness of 86.9; and a minus 3-micron fraction derived therefrom, and treated at a leach additional level of 8 lbs./ton, displayed a 90.5 brightness. $TiO_2$ content of the unleached sample was 0.50%, and $Fe_2O_3$ content was 0.50%.

Again in this Example the comparable laboratory-processed sample (minus 3-micron fraction) exhibited a product brightness, without leach addition, of 88.2; and where 8 lbs./ton of hydros were utilized, exhibited a leached brightness of 91.7 $TiO_2$ content of the unleached laboratory-processed sample was 0.30%, and $Fe_2O_3$ content was 0.67%.

Samples from the output of the flotation plant were processed as in the foregoing Examples, at a solids content of 30%. and a pH of 9.5. Data as set forth in the following Table III was obtained under such conditions, where the identification for such data is in accordance with prior discussion. Once again it is noted that very significant improvement in the product brightnesses are obtained in comparison to either the plant processes or those yielded where samples are froth flotation-processed under laboratory conditions. These brightness improvements again, are particularly significant at low levels of leach addition, or where leach is not used at all; and once again it is noted that the $TiO_2$ and the $Fe_2O_3$ content, within the limit of experimental error, are not significantly altered by treatment in the magnetic field, thereby suggesting that the observed improvements are in response to removal of other contaminants than these two fractions.

tions, were eliminated by conducting all tests under laboratory conditions. In particular, a first set of samples of soft sedimentary Georgia kaolins were subjected to blunging, followed by a magnetic separation step. A second set of similar samples were subjected to a laboratory flotation by thoroughly blunging and conditioning the samples with about 3.7 lb/ton ammonium hydroxide, (calculated at 100% ammonia) oleic acid in concentration of about 3.7 lb/ton and with about 2.7 lb/ton of sodium silicate. Total mechanical work dissipated during blunging and conditioning, considerably exceeded 25 hp-hrs./ton of solids. Finally, a third set of the samples were subjected to the flotation treatment mentioned, and thereupon passed through the magnetic separator. In each instance magnetic separation was effected in a steel wool matrix and at an average field intensity of approximately 15.5 kilogauss; and the slurry was passed through the separator at a dilution of about 15–30% solids, with the pH being adjusted to approximately 9.5 by ammonium hydroxide. In each instance in the Tables of the Examples, brightnesses are determined in accordance with the procedure previously identified, and for various levels of leach addition, ranging from 0 to 8 lbs/ton of sodium hydrosulfite.

EXAMPLE IV

In this Example the crude clay samples utilized had measured brightnesses of 83.5; $TiO_2$ content of 1.30%; and $Fe_2O_3$ content of 0.20%. The brightness data obtained, in accordance with the discussion of the proceeding paragraph is set forth in Table IV below:

Table IV

| Test | Product | 2 lbs. | 4 lbs. Hydros addition per ton | 6 lbs. | 8 lbs. | $TiO_2$ % | $Fe_2O_3$ % |
|---|---|---|---|---|---|---|---|
| Blunge & one pass through Mag.Sep. | 86.9 | 88.4 | 88.9 | 88.9 | 89.0 | 0.65 | 0.15 |
| Lab-Floated alone | 85.1 | 86.7 | 88.5 | 88.5 | 88.7 | 0.65 | 0.25 |
| Lab-Floated & one pass through Mag. Sep. | 90.0 | 90.7 | 90.9 | 90.9 | 90.8 | 0.70 | 0.23 |

EXAMPLE V

The clay samples used here exhibited a crude brightness of 84.6. The $TiO_2$ content of the crude was evaluated at 1.47%, and the $Fe_2O_3$ content as 0.23%. Data was obtained for these samples as set forth below in Table V.

Table III

| Feed Time Mins. | Product Brightness | Leached Brightness 2   4   6   8 pounds per ton of hydros | | | | $TiO_2$ % | $Fe_2O_3$ % |
|---|---|---|---|---|---|---|---|
| 4.5 | 89.4 | 91.0 | 91.3 | 91.4 | 91.4 | 0.36 | 0.41 |
| 9.0 | 89.0 | 90.0 | 91.1 | 91.3 | 91.3 | 0.34 | 0.46 |
| 18.0 | 88.3 | 90.2 | 90.4 | 90.5 | 90.5 | 0.42 | 0.48 |
| 27.0 | 88.6 | 90.4 | 90.9 | 91.1 | 90.8 | 0.50 | 0.43 |
| 5 passes of 27 mins. | 90.2 | 91.3 | 91.7 | 91.7 | 91.6 | 0.32 | 0.35 |

In Examples IV through VIII; now to be set forth, the practical difficulties attendant on performing tests of the present invention under full-scale industrial condi- Table V

| Test | Product | 2 lbs. | 4 lbs. Hydros addition per ton | 6 lbs. | 8 lbs. | $TiO_2$ % | $Fe_2O_3$ % |
|---|---|---|---|---|---|---|---|
| Blunge & one pass through Mag.Sep. | 87.3 | 90.8 | 90.5 | 90.5 | 90.5 | 0.92 | 0.17 |
| Lab-Floated alone | 87.8 | 90.4 | 91.2 | 91.4 | 91.4 | 0.65 | 0.17 |
| Lab-Floated & one | | | | | | | |

Table V-continued

| Test | Product | 2 lbs. | 4 lbs. | 6 lbs. | 8 lbs. | TiO₂ % | Fe₂O₃ % |
|---|---|---|---|---|---|---|---|
| | | | Hydros addition per ton | | | | |
| pass through Mag. Sep. | 89.5 | 91.0 | 92.1 | 92.3 | 91.9 | 0.52 | 0.09 |

EXAMPLE VI

In this instance the crude clay samples displayed brightnesses of 82.2; the TiO$_2$ content was 1.34%; and the Fe$_2$O$_3$ content, 1.09%. The data yielded upon testing of these crudes in accordance with the foregoing procedures is set forth in Table VI below.

Table VI

| Test | Product | 2 lbs. | 4 lbs. | 6 lb. | 8 lbs. | TiO₂ % | Fe₂O₃ % |
|---|---|---|---|---|---|---|---|
| | | | Hydros addition per ton | | | | |
| Blunge & one pass through Mag.Sep. | 84.7 | 87.2 | 89.1 | 89.1 | 89.1 | 0.90 | 0.97 |
| Lab-Floated alone | 86.8 | 88.9 | 89.8 | 90.4 | 91.5 | 0.16 | 1.08 |
| Lab-Floated & one pass through Mag. Sep. | 91.3 | 92.5 | 92.5 | 92.5 | 92.6 | 0.10 | 0.82 |

EXAMPLE VII

The yet further group of samples utilized in this test, had a crude brightness of 79.9; a TiO$_2$ content of 1.47%; and an Fe$_2$O$_3$ content of 0.40%. The associated data yielded upon testing of these samples is set forth in Table VII below.

Table VII

| Test | Product | 2 lbs. | 4 lbs. | 6 lbs. | 8 lbs. | TiO₂ % | Fe₂O₃ % |
|---|---|---|---|---|---|---|---|
| | | | Hydros addition per ton | | | | |
| Blunge & one pass through Mag. Sep. | 83.1 | 85.3 | 88.0 | 88.1 | 88.2 | 0.89 | 0.35 |
| Lab-Floated alone | 83.0 | 83.7 | 85.6 | 86.8 | 88.8 | 0.37 | 0.38 |
| Lab-Floated & one pass through Mag. Sep. | 88.1 | 88.9 | 89.8 | 90.3 | 91.3 | 0.37 | 0.30 |

EXAMPLE VIII

In this instance the samples utilized displayed a brightness from the crude of 82.1. The TiO$_2$ content was 1.27%; and the Fe$_2$O$_3$ content 1.18%. The pertinent data yielded upon testing these samples in accordance with the prior procedures, appears below as Table VIII.

Table VIII

| Test | Product | 2 lbs. | 4 lbs. | 6 lbs. | 8 lbs. | TiO₂ % | Fe₂O₃ % |
|---|---|---|---|---|---|---|---|
| | | | Hydros Addition per ton | | | | |
| Blunge & one pass through Mag.Sep. | 85.1 | 87.0 | 87.1 | 87.1 | 87.1 | 0.81 | 1.06 |
| Lab-Floated alone | 86.0 | 88.3 | 89.4 | 89.9 | 90.4 | 0.30 | 1.13 |
| Lab-Floated & one pass through Mag. Sep. | 89.4 | 90.5 | 90.5 | 90.5 | 90.5 | 0.30 | 0.78 |

EXAMPLE IX

In this instance the process of the present invention was practiced, utilizing as the clay samples the "Alphaplate" product of the assignee corporation. The designated product is a relatively coarse particle size delaminated Georgia kaolin clay. The samples utilized in the tests were plant-derived, and taken after the delamination operation, but prior to leaching. Said samples, in accordance with the usual mode of production of the Alphaplate product had already been subjected to a conventional froth flotation process, i.e. prior to delamination. The solids content of the slurry into the magnetic separator was, in this instance, 40%, and the pH was 8.0. The flow rate was such as to permit a residence time in the magnetic separator of approximately 1.2 minutes with the average field intensity being approximately 15 kilogauss. Table IX below, sets forth comparative brightness yielded for three sets of runs, where in each instance comparative data appears with and without the use of the magnetic separation step. The advantages yielded by the said subsequent step, are evident. It may once again be observed that though reduction in TiO$_2$ content does result from the magnetic separation, in general the change in TiO$_2$ and Fe$_2$O$_3$ in consequence of magnetic separation (as compared to the TiO$_2$ and Fe$_2$O$_3$ in samples which have been leached, but not subjected to magnetic separation) is so small as to not account for the relatively large increases in brightness.

Table IX

| Test | Product | 2 lbs. | 4 lbs. | 6 lbs. | 8 lbs. | TiO₂ % | Fe₂O₃ % |
| --- | --- | --- | --- | --- | --- | --- | --- |
| | | | Hydros addition per ton | | | | |
| Plant Prod.alone | 85.0 | 89.1 | 89.4 | 89.5 | 89.9 | 0.20 | 0.42 |
| Plant Prod. & Mag. Sep. | 89.6 | 91.8 | 91.8 | 91.8 | 91.8 | 0.12 | 0.42 |
| Plant Prod.alone | 85.7 | 89.3 | 89.8 | 89.9 | 90.1 | 0.25 | 0.48 |
| Plant Prod. & Mag.Sep. | 89.5 | 91.6 | 91.7 | 91.7 | 91.7 | 0.18 | 0.40 |
| Plant Prod.alone | 85.0 | 89.5 | 89.6 | 89.7 | 89.9 | 0.30 | 0.47 |
| Plant Prod. & Mag.Sep. | 89.0 | 91.5 | 91.5 | 91.5 | 91.5 | 0.22 | 0.38 |

EXAMPLE X

In this Example the effects of several factors are evaluated upon the present process. In particular, there is set forth as Table X, the results of processing samples of soft Georgia sedimentary kaolins, which in all instance have an initial TiO₂ content of 1.57%, and an Fe₂O₃ content of 0.75%. The 3-micron fraction of such materials is considered in the performed tests.

It will be noted that the Table first sets forth data at various levels of leach addition for samples which are (a) laboratory-floated, and (b) laboratory-floated and then subjected to magnetic separation. In each instance the magnetic separation is accomplished by diluting the samples yielded from flotation to 20% solids, and then conducting the separation at a residence time of approximately 1.2 minutes in an average magnetic field of 15.5 kilogauss. The pH was between 9.2 and 9.5, and the temperature approximately 30°C during the magnetic separation. The very marked improvement where laboratory flotation is followed by magnetic separation, is noted in accordance with prior Examples and discussion. The laboratory flotation process used in obtaining the data is in accordance with the discussion had in Example III.

In the tests of part (c), Table X, the samples used were subjected to conditions intended to simulate the normal flotation process of blunging, conditioning, dilution and flotation, except that no oleic (collector agent) was added. This is to say that although no collector was added, the work input (and other conditions) were identical to that where a floated sample was evaluated. A magnetic separation was then conducted in this series of tests, as discussed in connection with tests (b). The data yielded here, indicating a considerable diminution in brightness improvement where the collector agent is missing, strongly suggests that the work input provided during flotation is not the sole factor which accounts for the unexpected results yielded by the invention. It appears rather from this data, that the total flotation process, in some manner dependent upon both the physical and chemical conditions of flotation, renders new elements removable by the magnetic sepation process.

For further comparison, there is set forth in Table X — at (d) and (e), the results yielded where the same samples otherwise processed to yield the data of the Tables, are blunged at 60% solids, and thereupon (after dilution to 20% of solids) subjected to a magnetic separation step in accordance with the conditions previously set forth; and where blunging is conducted at 20% solids and the resultant slurry subjected to a magnetic separation step. Comparison of results (d) and (e) with results (c), reveals that blunging coupled with magnetic separation yields brightness improvements not much smaller than those developed where flotation is simulated without the collector agent. This would suggest further support for the hypothesis that it is the total flotation process, i.e. a combination of energy dissipation and other steps in the presence of collector agent, which is instrumental in the present invention.

Table X

| | Product | 2 lbs. | 4 lbs. | 6 lbs. | 8 lbs. | TiO₂ | Fe₂O₃ |
| --- | --- | --- | --- | --- | --- | --- | --- |
| | | | Hydros addition lbs.per ton | | | | |
| (a)Lab-Float alone | 87.7 | 89.7 | 90.8 | 90.6 | 90.8 | 0.29 | 0.53 |
| (b)Lab-Float + Mag. Sep. | 89.5 | 91.0 | 91.6 | 91.7 | 91.7 | 0.27 | 0.48 |
| (c)Lab-Float without collector agent+Mag.Sep. | 87.5 | 88.4 | 89.1 | 89.4 | 89.4 | 0.89 | 0.55 |
| (d)Blunged 60% solids,followed by Mag.Sep. | 87.0 | 88.9 | 89.4 | 89.5 | 89.5 | 0.86 | 0.47 |
| (e)Blunged 20% solids,followed by Mag.Sep. | 86.9 | 89.5 | 89.6 | 89.6 | 89.6 | 0.89 | 0.53 |

While the present invention is particularly set forth in terms of specific embodiment thereof, it will be understood in view of the instant disclosure that numerous variations upon the invention are now enabled to those skilled in the art, which variations yet reside within the scope of the present teaching. Accordingly, the invention is to be broadly construed and limited only by the scope and spirit of the claims now appended hereto.

I claim:

1. A method for brightening a kaolin clay, comprising:

forming an aqueous dispersion of said clay, and blunging and conditioning said dispersion as to dissipate at least 10 h.p.-hrs. of energy per ton of solids, at least said conditioning step being conducted in the presence of oleic acid as a collecting agent;

subjecting the resultant blunged and conditioned slurry to a froth flotation treatment to remove titaniferous impurities; and subjecting the product from said froth flotation treatment to a wet magnetic separation to further increase the brightness of said clay be removal of discoloring contaminants in addition to said titaniferous impurities, by passing said product through a slurry-pervious ferromagnetic matrix positioned in a high intensity magnetic field, the retention time in said field being at least 15 seconds, and the said field being maintained at an average field intensity of from 7 to 22 kilogauss.

2. A method in accordance with claim 1, further including the steps of flocculating the slurry from said magnetic separation; leaching said flocculated slurry; and washing the product clay free of residual leaching agents and reaction products.

3. A method in accordance with claim 1, wherein said field is maintained at from about 15 to 20 kilogauss.

4. A method in accordance with claim 3, wherein said magnetic separation step is effected by passing said aqueous slurry through a filamentary matrix maintained in said magnetic field.

5. A method in accordance with claim 4, wherein said matrix comprises a steel wool.

6. A method in accordance with claim 1, wherein said blunging and conditioning steps are conducted while said slurry includes from about 35 to 60% solids content.

7. A method in accordance with claim 6, wherein said blunging and conditioning steps are carried on simultaneously.

8. A method in accordance with claim 7, wherein said blunging and conditioning step is conducted by agitating said dispersion under alkaline conditions in the presence of said oleic acid, as a collector agent, and of sodium silicate as a dispersant.

9. A method in accordance with claim 8, wherein said oleic acid is present in concentrations of from about 2 to 4 lbs/ton, and said sodium silicate is present in quantities of from about 1/2 to 16 lbs/ton of clay.

10. A method in accordance with claim 9, wherein from about 1/2 to 3 lbs/ton of a water soluble salt of a polyacrylic acid or polymethacrylic acid are present in said slurry during said blunging and conditioning step.

11. A method in accordance with claim 1, wherein at least 25 h.p.-hrs. of energy per ton of solids are dissipated during said blunging and conditioning steps.

12. A method in accordance with claim 11, wherein said oleic acid is present in concentrations of from about 2 to 4 lbs/ton of solids.

* * * * *